United States Patent [19]

French

[11] Patent Number: 4,609,849
[45] Date of Patent: Sep. 2, 1986

[54] HIGH PRESSURE SODIUM VAPOR LAMP HAVING D.C. RESISTIVE BALLAST CIRCUITS

[75] Inventor: Park French, Aurora, Ohio

[73] Assignee: General Electric Company, Schenectady, N.Y.

[21] Appl. No.: 679,143

[22] Filed: Dec. 6, 1984

[51] Int. Cl.[4] ............... H05B 37/00; H05B 39/00; H05B 41/14

[52] U.S. Cl. ................ 315/200 R; 315/207; 315/208; 315/241 R; 315/244; 315/245; 315/239

[58] Field of Search ............ 315/49, 53, 61, 200 R, 315/207, 208, 241 R, 244, 239, 289, 245

[56] References Cited

U.S. PATENT DOCUMENTS 3,248,590  4/1966  Schmidt .
4,051,412  9/1977  Knoble et al. ............ 315/208 X
4,223,247  9/1980  Jacobs et al. ............ 315/60 X
4,316,124  2/1982  Verwimp et al. ............ 315/49 X
4,382,210  5/1983  Buhrer ............ 315/49 X
4,555,647 11/1985  Leskovec et al. ............ 315/241 R X Primary Examiner—Saxfield Chatmon
Attorney, Agent, or Firm—John P. McMahon; Philip L. Schlamp; Fred Jacob

[57] ABSTRACT

Various embodiments of direct current (D.C.) ballasting circuits for low wattage high pressure sodium (HPS) vapor lamps are disclosed. In one ballast embodiment a negative going high voltage pulse is applied directly to the H.P.S. lamp cathode during the starting operation and the ballast circuit preferentially diverts a major portion of the HPS lamp current around a high-voltage transformer during normal operation so as to reduce the resistive heating of the transformer. In a second ballast embodiment, capacitors are arranged into voltage multiplying circuit for generating the high D.C. starting voltage along with diodes that reduce the power dissipation of the ballast circuit.

7 Claims, 2 Drawing Figures

HIGH PRESSURE SODIUM VAPOR LAMP HAVING D.C. RESISTIVE BALLAST CIRCUITS

BACKGROUND OF THE INVENTION

This invention relates to ballast circuits, and more particularly, to improved D.C. resistive ballast circuits for high pressure sodium vapor lamps.

High pressure sodium vapor lamps have found widespread use during the past decade for commercial lighting applications, especially outdoor lighting. Such lamps are described in U.S. Pat. No. 3,248,590 of Schmidt, entitled "High Pressure Sodium Vapor Lamps", and which is assigned to the same assignee as the present invention.

High pressure sodium (H.P.S.) vapor lamps typically utilize an inner ceramic arc tube having an appropriate metallic fill as its light source. A ballast circuit is provided to supply the necessary voltage to the H.P.S. lamp to cause its initial starting and operating arc conditions. U.S. Pat. No. 4,223,247 discloses a ballast circuit adapted to receive an A.C. power source applied across its input terminals and generate the necessary starting and operating voltages for the metal vapor discharge lamp.

The ballast circuit of U.S. Pat. No. 4,223,247 provides an A.C. operational voltage to the arc tube and embodies a transformer that is connected to one side of the path of the applied A.C. power. The current flow through the transformer creates resistive heating within the transformer which contributes to the reduction of the operational life of the transformer. It is desired that means be provided which reduce the resistive heating of the transformer so as to increase the expected operational life of the transformer.

The A.C. operating voltage applied to the arc tube causes two electrodes, internally connected within the arc tube, to alternately serve as the anode and the cathode of the arc tube. With regard to certain parameters of the arc tube, it is desired that one electrode serve only as the cathode while the other electrode serve only as the anode both in the arc tube. To accomplish such a fixed cathode and anode orientation, it is desired that a ballast circuit provide a D.C. operating voltage to the arc tube.

With further regard to the ballast circuit for the high pressure sodium lamp, the inductive transformer while assisting in providing a desired starting voltage to the arc tube has disadvantages with regard to its physical size and its previously discussed inherent resistive heating. It is desired that ballast means, other than inductive, be provided to assist in the generation of the starting voltage for the arc tube.

Still further, the power dissipation of the ballast circuit exclusive of the ballast resistor is considered important in that if it can be reduced, the temperature of the remainder of the circuit can be reduced, which is beneficial to the lifetime of some components. It is considered desirable that means be provided which reduce the power dissipation of the ballast circuit exclusive of the ballast resistor and that such means be provided to position the ballast resistor apart from the remainder of the circuitry so that its dissipation will not cause objectionable heating of the remainder of the circuitry.

Accordingly, objects of the present invention are to provide various ballast circuits for high pressure sodium (HPS) lamps which: (1) reduce the resistive heating of the transformer which assists in generating the high voltage starting pulse for the HPS lamp; (2) develop, along with the reduced resistive heating of the transformer, a D.C. operating voltage which is applied to the H.P.S. lamp; (3) develop a starting voltage which is applied to the HPS lamp without the need of a transformer; and (4) reduce the power dissipation of the ballast circuit itself exclusive of the ballast resistor.

These and other objects of the present invention will become apparent upon consideration of the following description of the invention.

SUMMARY OF THE INVENTION

The invention is directed to various ballast circuits for developing a D.C. operating voltage for a high pressure sodium (H.P.S.) lamp. The ballast circuits have various voltage multiplying means for generating a starting voltage for the high pressure sodium (H.P.S.) lamp. In one embodiment the starting voltage is relatively high voltage pulse applied to the H.P.S. lamp whereas, in another embodiment, the starting voltage is a relatively high direct-current (D.C.) voltage impressed across the H.P.S. lamp. The ballast circuits further comprise means for reducing the power dissipation of the ballast circuits.

The ballast circuits comprising a full-wave rectifier adapted to receive across its input nodes an alternating current (A.C.) source and develops across its output nodes a D.C. voltage serving as the operating voltage of the H.P.S. lamp. In one embodiment the D.C. developed voltage is applied to an electronic pulsing circuit having a transformer, means for storing an electrical charge, and a switching means for sensing the voltage applied to the H.P.S. lamp. The sensing means causes the stored energy in the form of a high voltage starting pulse to be applied across and to start the H.P.S. lamp. In other embodiments the high voltage D.C. started voltage is generated by capacitor voltage multiplying circuits. The ballast circuits further comprise means for reducing the power dissipation of the ballast circuits.

The present invention may best be described by reference to the following description of the drawing and the detailed description of the preferred embodiments.

DETAILED DESCRIPTION OF PREFERRED EMBODIMENTS

Figure 1:
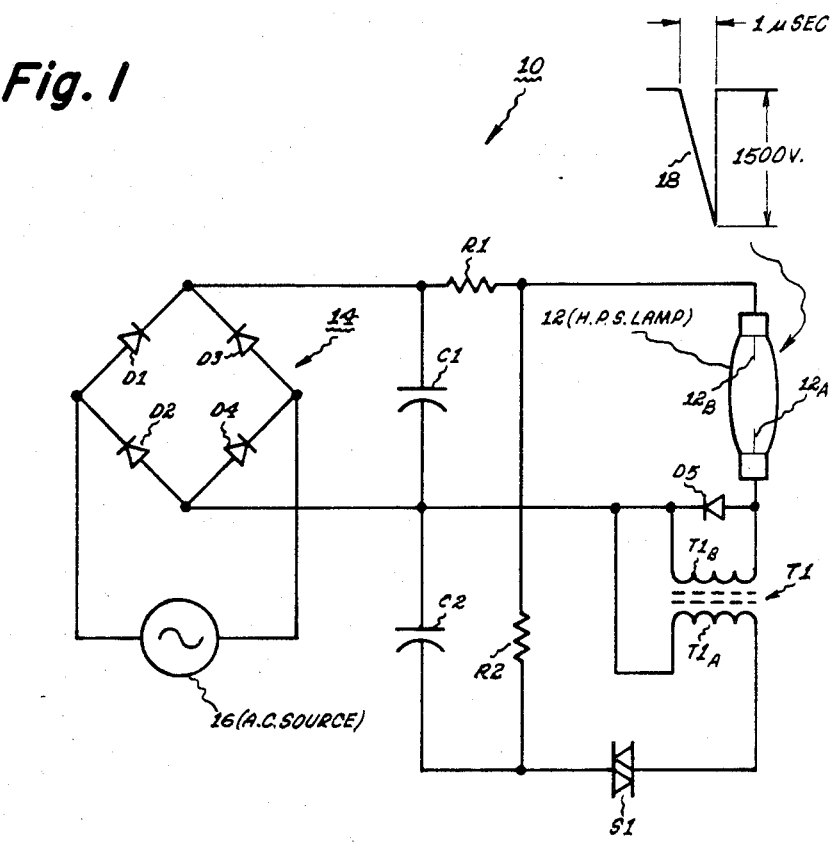
FIG. 1 is a circuit arrangement of a ballast circuit in accordance with one embodiment of the present invention.

A circuit arrangement of one embodiment of a ballast circuit 10 of the present invention is illustrated in FIG. 1. The ballast circuit 10 of FIG. 1 comprises a plurality of circuit elements having a typical value or of a typical type given in TABLE 1.

TABLE 1

| Elements | Value or Type |
| --- | --- |
| D1, D2, D3 and D4 | Diode of the type IN4007. |
| D5 | Diode of the type MR1-1600 |
| C1 | 50 microfarads capacitor. |
| C2 | 0.03 microfarads capacitor. |
| R1 | 60 watt, 120 volt lamp filament. |
| R2 | 1 megohm resistor. |
| T1 | Ferrite transformer having |

TABLE 1-continued

| Elements | Value or Type |
|---|---|
| | a trigger coil. |
| S1 | SIDAC having a voltage breakdown characteristic of about 120 volts, an average current characteristic of about 1 ampere, and a surge current characteristic of about 13 amperes. |

The transformer T1 of Table 1 may be of the type used in a MXR-175 H.P.S. lamp available from the Lighting Business Group of the General Electric Company. The transformer T1 has a primary winding $T1_A$ and a secondary winding $T1_B$ both shown in FIG. 1. The resistor R1 is a ballast resistor and is preferably an incandescent filament located in close proximity to the H.P.S. lamp 12. The incandescent filament may supply a supplementary light source for the H.P.S. lamp 12 and may be located within the confines of the H.P.S. lamp 12 itself.

FIG. 1 further illustrates a high pressure sodium lamp 12 which may be of the type described in U.S. Pat. No. 3,248,590 of Schmidt, entitled "High Pressure Sodium Vapor Lamp," herein incorporated by reference, and to which reference may be made for further details of the HPS lamp 12.

FIG. 1 illustrates the circuit arrangement 10 having diodes D1, D2, D3, and D4 arranged in full-wave rectifier configuration 14. The full-wave rectifier 14 is adapted to receive an alternating current (A.C.) source 16 applied across its input nodes and having typical values of 120 volts at a frequency of 60 HZ. The full-wave rectifier 14 develops a D.C. voltage across its first and second output nodes preferably having connected thereto a filter capacitor C1. The D.C. voltage developed by the full-wave rectifier serves as the operating voltage of the H.P.S. lamp 12. The first output node of the full-wave rectifier is connected to a ballasting resistor R1, which as given in Table 1 is preferably an incandescent 120 volts, 60 watt filament, serially connected to one end of H.P.S. lamp 12. The H.P.S. lamp 12 has an internal electrode $12_A$ serving as its cathode and another electrode $12_B$ serving as its anode.

The D.C. developed voltage of full-wave rectifier 14 is filtered by capacitor $C_1$ and applied to (1) the ballasting resistor R1, and (2) an electronic pulsing circuit. The pulsing circuit preferably has a resistor R2 serving as a current limiting device for the charging of capacitor $C_2$. The pulsing circuit further comprises the transformer T1, the diode D5 which preferentially diverts the current to flow away from the transformer T1, the capacitor $C_2$ for storing an electrical charge, and switching means SIDAC S1 for sensing the voltage applied to the H.P.S. lamp 12 and for discharging the stored energy in capacitor $C_2$ across the H.P.S. lamp 12 when the voltage applied across the H.P.S. lamp 12 equals or exceeds a predetermined value.

The ballast circuit 10 generates a negative going relatively high voltage starting pulse 18 having typical values of an amplitude of about 1500 volts and a duration of about 1 microsecond. The amplitude characteristic of signal 18 is primarily determined by the voltage across $C_2$ and the turns ratio of T1, whereas, the pulse duration of signal 18 is primarily determined by the capacitance of $C_2$ and the inductance of $T1_B$. The starting pulse 18 is applied directly to the cathode $12_A$ of the H.P.S. lamp 12 and creates the breakdown or starting condition usually occurring immediately upon the application of the starting pulse 18 except during the cases of hot restart of lamp 12 for which the pulse 18 is applied a few times per second until the lamp 12 cools down sufficiently for its starting condition to occur.

The diode D5 is connected across the secondary winding $T1_B$ of transformer T1. The primary winding $T1_A$ has one of its ends connected to the cathode of SIDAC S1 and its other end connected to a node formed by (1) one end of secondary $T1_B$, (2) one end of capacitor C2, and (3) one end of capacitor C1. The anode of SIDAC S1 is connected to (1) one end of resistor R2, and to (2) the other side of capacitor C2. The other end of resistor R2 is connected to one end of resistor R1 and to the anode $12_B$ of the HPS lamp 12.

In general, the circuit arrangement 10 operates in the following manner, (1) when the HPS lamp 12 is initially energized it is a very high impedance device so that the majority of current developed by the full-wave rectifier 14 flows through the resistors R1 and R2 so as to charge the energy-storage capacitor C2, (2) when the voltage across the capacitor C2 equals or exceeds the breakdown or turn-on voltage characteristic of SIDAC S1, having a typical value of 120 volts, the SIDAC S1 is rendered conductive, (3) the conductive S1 provides a low impedance path so that the energy stored in capacitor C2 is suddenly discharged through the primary winding $T1_A$ which discharge produces a potential on the secondary winding $T1_B$ sufficient to cause the breakdown condition of H.P.S. lamp 12, (4) the arc condition of lamp 12 then sequences the lamp 12 from a high impedance device to a low impedance device, (5) the current flowing through R1 is then preferentially directed to the lamp 12, and finally (6) the transformer T1, resistor R2 and capacitor C2 are effectively removed from the circuit arrangement 10 since the thermionic condition of lamp 12 prevents the voltage across the energy storage C2 from reaching the turn-on voltage of the SIDAC S1. After breakdown condition, that is, during the normal operation, the full-wave rectifier 14 and the preferred filter capacitor C1 supply current and a D.C. operating voltage having a typical value of 80 V.D.C. is applied to the lamp 12 through the resistor ballast R1.

The diode D5 of circuit arrangement 10 is of substantial importance to the present invention. The diode D5 in its conductive state diverts a majority of the current flowing in the lamp 12 during its normal operation away from or around the transformer T1 thereby reducing the resistive self-heating of the transformer T1. The operation of diode D5 reduces the resistive heating of the transformer T1 by a factor of approximately 1000.

It should now be appreciated that the circuit arrangement 10 while reducing the self-heating of the transformer still provides for enhanced D.C. or two-terminal operation of the H.P.S. lamp 12. The enhanced D.C. operation of H.P.S. lamp 12 is also provided by a second embodiment of the present invention shown in FIG. 2.

Figure 2:
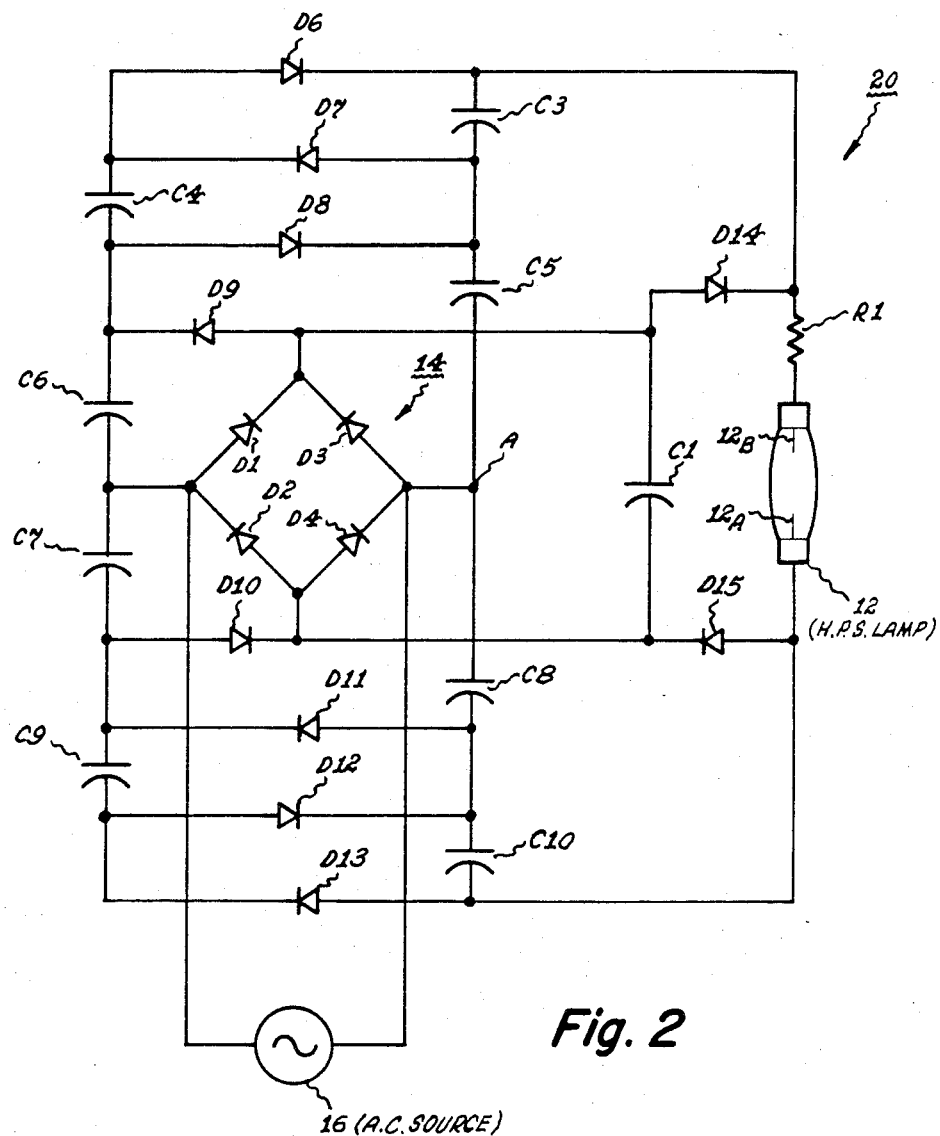
FIG. 2 is a circuit arrangement ballasting circuit in accordance with another embodiment of the present invention.

FIG. 2 shows a circuit arrangement 20 which generates a relatively high D.C. voltage of approximately 1300 volts which is impressed across the H.P.S. lamp 12 for causing the breakdown or starting condition of the H.P.S. lamp 12. Circuit arrangement 20 of FIG. 2 is comprised of the full-wave rectifier 14 having across its first and second output nodes the preferred filter capacitor C1, the ballast resistor R1, and a plurality of elements of the type or having the typical values specified in Table II.

TABLE II

| | |
|---|---|
| D1, D2, D3, D4, D6, D7, D8, D9, D10, D11, D12 and D13 | Diodes of the type IN4007. |
| D14 and D15 | Diodes of the type MR1-1400. |
| $C_1$ | 50 microfarads capacitor. |
| $C_3$–$C_{10}$ | .01 microfarads capacitor. |
| $R_1$ | 60 watt, 120 volt lamp filament. |

The starting voltage for the H.P.S. lamp 12 is derived from a capacitor voltage multiplier arrangement having capacitors C3, C4, C5, C6, C7, C8, C9, and C10. The capacitor multiplier arrangement $C_3 \ldots C_{10}$ generates the starting voltage only during the initial conditions of the H.P.S. lamp 12 and also generates such starting voltage while consuming a relatively low amount of power during normal operation of the lamp 12.

The starting voltage is developed during the initial or high impedance condition of H.P.S. lamp 12 by two symmetrical network of the circuit arrangement 20 during alternate cycles of the applied A.C. voltage 12. The first symmetrical portion of circuit 20 is formed of diodes D9, D8, D7, and D6, and capacitors C6, C5, C4 and C3. The second symmetrical portion of circuit 20 is formed of diodes D10, D11, D12, and D13, and capacitors C7, C8, C9 and C10. The forward biased condition of diodes D9, D8, D7 and D6 couple the first output node of the full-wave rectifier 14 to the H.P.S. lamp 12, whereas, the forward biased condition of diodes D10, D11, D12, and D13 couple the second output node of the full-wave rectifier to the other end of the H.P.S. lamp 12.

For a line input voltage of about 120 volts RMS, the forward biased diode D9 allows capacitor C6 to be charged to a D.C. voltage of 168 volts. The forward biased diode D8 allows capacitor C5 to be charged to a D.C. voltage of 335. The forward biased diode D7 allows capacitor C4 to be charged to a D.C. voltage of 335 volts. The forward biased diode D6 allows capacitor C3 to be charged to a D.C. voltage of 335. The forward biased diodes D10, D11, D12, and D13, respectively, allow capacitors C7, to be charged to −168 D.C. volt and C8, C9, and C10 to be each charged to a D.C. value of −−335 volts each.

The additive voltages on capacitors C5 and C3 generate the +670 volt D.C. starting voltage with respect to point A, whereas, the additive voltages on capacitors C8 and C10 generate the −670 volt D.C. starting voltage with respect to point A. Together, these voltages sum to 1340 D.C. volts impressed across the H.P.S. lamp 12.

The capacitor arrangements C3–C5 and C8–C10 are no longer charged after the breakdown condition of lamp 12. After the breakdown condition of lamp 12, the lamp 12 becomes a low impedance device preferentially routing the D.C. voltage output of the full-wave rectifier D1, D2, D3 and D4 and the filter capacitor C1 directly to the serially arranged ballast resistor R1 and lamp 12.

The circuit arrangement 20 preferably has the cathode of a preferentially directing diode D14 connected to the first end or anode $12_B$ via resistor R1, and the anode of a preferentially directing diode D15 connected to the second end or cathode $12_A$. The anode of diode D14 and the cathode of diode D15 are respectively connected to opposite ends of the filter capacitor C1.

The preferentially directing diodes D14 and D15 are arranged to be nonconducting prior to breakdown of the H.P.S. lamp 12, but continuously conducting during normal operation of the H.P.S. arc.

The diodes D14 and D15 provide the means, after the lamp 12 has been started, for shunting or diverting the D.C. operating current around the diodes D6 through D13 so as to be applied directly to the lamp 12. The diodes D14 and D15 preferentially reduce the voltage drop typically expected across the diodes D6 through D13 by about 4 volts. This 4 volt reduction implemented in the ballast circuit of FIG. 2 which is supplying a typical D.C. operating current of 0.4 amps to the lamp 12 yields a 1.6 watt reduction in power dissipation.

It should now be appreciated that the practice of the present invention provides various D.C. ballasting circuits for enhanced starting and operation of the high pressure sodium vapor lamp 12 of FIG. 1.

What I claim as new and desire to secure by Letters Patent of the United States is:

1. A ballast circuit for a high pressure sodium (H.P.S.) lamp comprising:
   a full-wave rectifier adapted to receive across its input nodes an alternating current (A.C.) source and which develops a direct current (D.C.) voltage across its first and second output nodes serving as the operating voltage of said H.P.S. lamp;
   a ballast resistor having a first end connected to the first output node and its second end connected to a first end of said H.P.S. lamp;
   a capacitor for storing an electrical charge having a first end connected to said second end of said ballast resistor and its second end connected to the second output node;
   a transformer having a primary and a secondary winding, each of the primary and secondary windings having their first end connected to said second output node, the second end of said secondary winding being connected to the second end of said H.P.S. lamp;
   a diode having its cathode and anode respectively connected to said first and second ends of said secondary winding; and
   a switching means for sensing the voltage applied to said H.P.S. lamp and having a preselected breakdown voltage characteristic, said switching means having one end connected to the second end of said primary winding and its other end connected to said first end of said capacitor.

2. A ballast circuit according to claim 1 further comprising a filter capacitor connected across said first and second output nodes of said full-wave rectifier.

3. A ballast circuit according to claim 1 further comprising a current-limiting resistor connected between said first end of said capacitor and said second end of said ballast resistor.

4. A ballast circuit according to claim 1 wherein said ballast resistor is an incandescent filament located in close proximity with said H.P.S. lamp.

5. A ballast circuit for a high pressure sodium (H.P.S.) lamp comprising:
   a full-wave rectifier adapted to receive across its input nodes an alternating current (A.C.) source and which develops a direct current (D.C.) voltage across its first and second output nodes serving as the operating voltage of said, H.P.S. lamp;

first and second preferentially directing diodes respectively connected to said first and second output nodes and arranged to be conductive during the same alternate cycle of said A.C. source; said first and second preferential directing diodes connected to first and second ends of said H.P.S. lamp;

a ballast resistor connected between said first preferentially directing diode and the first end of said H.P.S. lamp;

first and second symmetrical networks for respectively coupling said first and second output nodes to said first and second ends of said H.P.S. lamp, said first and second symmetrical networks each comprising an arrangement of a plurality of diodes and capacitors, each of said arrangement of said symmetrical networks respectively having said diodes configured to be conductive during the same alternate portions of the cycle of said A.C. source, each of said arrangement comprising;

a first capacitor having a first end connected to one side of said A.C. source and its second end connected to said first output nodes by a first of said plurality of conductive diodes;

a second capacitor having a first end connected to the other side of said A.C. source and its second end connected to said second end of said first capacitor by a second of said plurality of conductive diodes;

a third capacitor having a first end connected to said second end of said first capacitor and its second end connected to said second end of said H.P.S. lamp by a third of said plurality of conductive diodes; and a fourth capacitor having a first end connected to both said second end of said second capacitor and said second end of said third capacitor, said fourth capacitor having its second end connected to said second end of said H.P.S. lamp.

6. A ballast circuit according to claim 5 further comprising a filter capacitor connected across said first and second output nodes of said full-wave rectifier.

7. A ballast circuit according to claim 5 wherein said ballast resistor is an incandescent filament located in close proximity with said H.P.S. lamp.

* * * * *